United States Patent [19]

Fuchs et al.

[11] Patent Number: 4,664,803

[45] Date of Patent: May 12, 1987

[54] ANAEROBIC TREATMENT OF WASTEWATER

[75] Inventors: Uwe Fuchs; Hans Reimann, both of Munich, Fed. Rep. of Germany

[73] Assignee: Linde Aktiengesellschaft, Wiesbaden, Fed. Rep. of Germany

[21] Appl. No.: 788,707

[22] Filed: Oct. 21, 1985

Related U.S. Application Data

[63] Continuation of Ser. No. 536,077, Sep. 26, 1983, abandoned, which is a continuation of Ser. No. 298,428, Sep. 1, 1981, abandoned.

[30] Foreign Application Priority Data

Sep. 1, 1980 [DE] Fed. Rep. of Germany ....... 3032869

[51] Int. Cl.$^4$ .............................. C02F 3/28; C12P 5/02
[52] U.S. Cl. ..................................... 210/603; 210/616; 210/617; 210/150; 210/903; 435/167; 48/197 A
[58] Field of Search ............... 210/617, 618, 603, 605, 210/616, 903, 150, 151, 500.1, 502.1; 435/167; 48/197 A

[56] References Cited

U.S. PATENT DOCUMENTS

| | | | |
|---|---|---|---|
| 3,171,820 | 3/1965 | Volz | 260/2.5 |
| 3,293,174 | 12/1966 | Robjohns | 210/617 |
| 3,846,289 | 11/1974 | Jeris et al. | 210/903 |
| 4,043,936 | 8/1977 | Francis et al. | 210/617 |
| 4,182,675 | 1/1980 | Jeris | 210/603 |
| 4,256,573 | 3/1981 | Shimodaira et al. | 210/618 |
| 4,419,243 | 12/1983 | Atkinson et al. | 210/618 |

FOREIGN PATENT DOCUMENTS 655819  5/1965  Belgium .............. 210/617

*Primary Examiner*—Benoit Castel
*Attorney, Agent, or Firm*—Millen & White

[57] ABSTRACT

In the anaerobic biological treatment of wastewater, the anaerobic microorganisms are incorporated on carrier material having a density of 10–200 kg/m$^3$ and open macropores of a diameter of 0.1 mm to 5 mm, e.g., polyurethane foam or foam rubber. The treatment can be conducted as a pretreatment or a final stage in either a stationary bed or when the carrier is in particulate form, in an agitated tank or fluidized bed.

10 Claims, 1 Drawing Figure

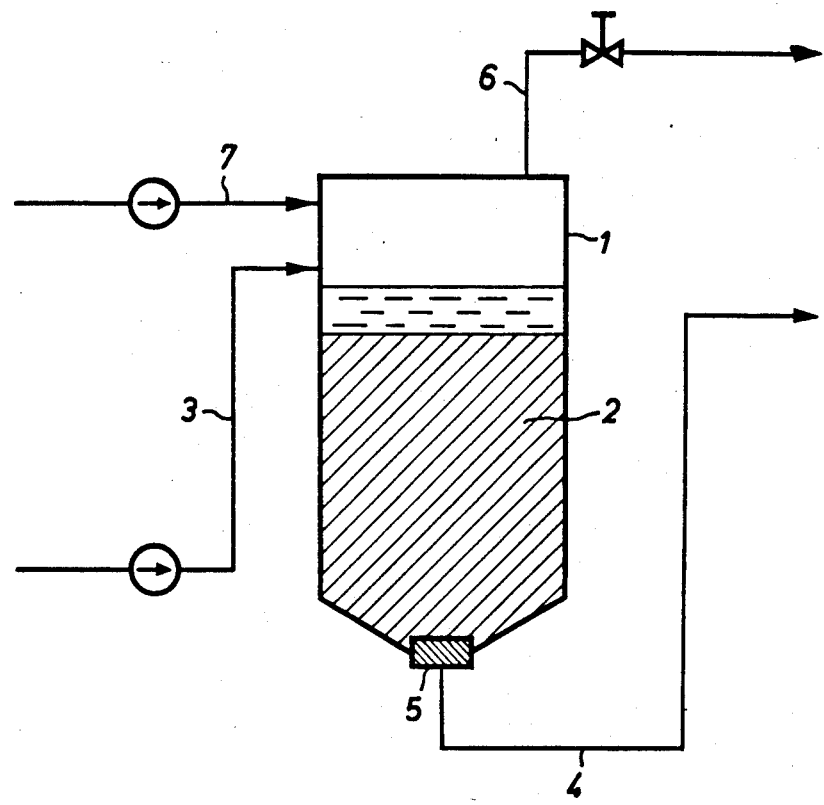

ANAEROBIC TREATMENT OF WASTEWATER

This application is a continuation of application Ser. No. 536,077 filed Sept. 26, 1983, which in turn is a continuation of application Ser. No. 298,428 filed Sept. 1, 1981, both now abandoned.

BACKGROUND OF THE INVENTION

This invention relates to a process and apparatus for the anerobic biological treatment of wastewater containing organic pollutants, and in particular to a process wherein the water is conducted through at least one reactor wherein the anaerobic microorganisms are incorporated at a carrier material.

Such anaerobic wastewater treatment methods have been known for a long time. The carrier material, usually of crushed rock, slag, or activated carbon, functions, on the one hand, to prevent the anaerobic microorganisms from being entrained with the treated wastewater effluent and, on the other hand, to provide, surface area for thorough contact in the reactor between the wastewater to be treated and the biomass. This process, however, has the disadvantage that the wastewater, in following the path of least resistance, "short circuits", resulting in only a portion of the surface area of the carrier material coming into contact with the wastewater. Furthermore, a gradual movement of the carrier particles, for improving mass transfer and conversion, is not readily possible due to the character of the material, and would in any event lead to extensive erosion of the carrier material proper. Moreover, especially when using reactors having a relatively high ratio of length to diameter, i.e. a reactor with only minor back mixing, there is the danger that with a high concentration of the organic substrate, the anaerobic bacteria will be inhibited in their growth or even destroyed. Conversely, if the loading of the carrier material with the substrate is kept sufficiently low so as to avoid damage to the biomass, there is still the danger, especially in case of a low laminar flow of the wastewater to be treated through the reactor, that the growth rate of the biomass on the carrier material will become so high that clogging of the reactor will occur.

SUMMARY OF THE INVENTION

An object of this invention is to provide a process of the type generally described above, as well as an apparatus for conducting the process, improved from the standpoint that decomposition of at least a substantial proportion of the pollutants contained in the wastewater to be treated is conducted with high process stability in a simple and, above all, economical fashion.

Upon further study of the specification and appended claims, further objects and advantages of this invention will become apparent to those skilled in the art.

These objects are attained according to the present invention by arranging in the reactor, as the carrier material for the anaerobic microorganisms, macroporous substances having a low specific gravity.

With the use of a macroporous substance having a low specific gravity as the carrier material, a large active colonization settling surface is made available to those microorganisms which participate in the anaerobic process and grow only very slowly; also, the microorganisms are distributed on this surface in a uniform and firmly fixed way. Thus, the losses of bacterial mass cannot become so large that the efficiency of the reactor is decreased or, in the extreme case, destroyed. By virtue of the macropores of the carrier material, the bacteria are forced to grow in a decentralized fashion, whereby a substantially larger mass transfer surface is obtained than in conventional processes with different carrier materials, and excessive growth is initially precluded. Additionally, owing to the low specific gravity of the macroporous substances, it is made possible that these substances, if they consist of discrete particles, can be stirred up even at minor flow velocities of the wastewater whereby mass transfer and conversion rates are increased.

Due to the large mass transfer area and the concomitant improved efficiency, the process of this invention can be utilized by itself, without further treatment of the wastewater. This single stage operation will yield a final $BOD_5$ content of about 50 mg/l; moreover, operational safety is outstanding inasmuch as it is possible to employ relatively short digestion times, e.g., about 2 h (h=hours) to 2 days. Alternatively, the process of this invention can be used especially economically as a preliminary treatment stage with a follow-on final treatment stage. In such a case, acceptable $BOD_5$ values in the effluent of the preliminary treatment stage are 100 mg/l to 1000 mg/l. Due to the large mass transfer surfaces, even shorter treatment times of a few days or even hours are made possible. If the anaerobic process is carried out in two reactors, it is preferred to conduct the acid-forming phase in the first reactor and the methane-forming phase in the second reactor. The carrier material can be incorporated in both reactors or only in the second reactor.

In this connection, it is suitable to employ as the carrier material substances having a density of 10–200, preferably 20 to 80 $kg/m^3$ and having open macropores with a diameter of 0.1 to 5, preferably 1 to 3 mm. With these sizes of macropores, a large surface area for colonization is provided for the bacteria participating in the anaerobic process, and clogging of the pores is by and large eliminated. Moreover, with low density particulate carriers, agitation can be readily accomplished even in the case of low flow velocities of the wastewater to be treated.

Organic polymers are advantageously employed as the carrier materials fulfilling the above conditions. The above-mentioned requirements are met, in particular, by polyurethane foam material or foam rubber, or similar materials having open macropores, as they are produced in the plastics manufacturing industry; furthermore, inexpensive remnants and scrap can be utilized for this purpose. For instance, as urethane foam particles ester or ether-linked particles can be used. Other useful organic carrier materials are polyethylene silicon-polymers. Furthermore, inorganic carrier materials such as inflated clay, pumice, gravel or foamed metals can possibly be used, too.

In a preferred embodiment of the process, the carrier materials are employed as discrete substantially spherical cubic particles having a diameter of 0.5 to 50, preferably 10 to 20 mm. This size of the discrete particles permits a high biomass concentration. Besides, particles having such a size can be readily stirred so that, as mentioned above, the conversion rate is still further increased.

As one technique to provide turbulence, it is especially advantageous to produce a fluidized bed with the carrier material, wherein the wastewater is conducted through the reactor from the bottom toward the top at an appropriate velocity.

However, it is just as advantageous, for the same purpose, to use an agitated vessel as the reactor. With slow rotational velocities of the agitator of about 1-10 rpm, the mechanical stress on the carrier particles is so small that they are not broken up. On the other hand, the rotational velocity of 1-10 rpm is still high enough for moving the discrete particles about, in such a way so as to provide intense mass transfer and conversion of matter. The agitator or stirrer can be designed, for example, of a simple flexible synthetic resin rod, the tip speed of the agitator stirrer having a velocity of 20 to 200 cm per second, the rod and the reactor having the following dimensions:

radius of the agitator stirrer: 1 to 2 m
radius of the reactor: 1.2 to 2.5 m

However, if a highly concentrated wastewater is to be treated, e.g., BOD of at least 5000 mg/l, it is more suitable to form a conventional stationary bed with the carrier material in order to obtain adequate microbiological anaerobic decomposition of the dissolved solids. In particular, when using particulate carrier material, the flow velocity of the wastewater must be correspondingly adjusted. For a stationary bed the flow velocity of the wastewater should be in the range of 0.02 to 1 m/h.

Instead of using particulate carrier, there is, moreover, the possibility of providing a single, large block of organic polymer in the reactor. The cellular structure of such a block is an adequate deterrent against the phenomenon of bacteria participating in the anaerobic process growing together into a dense layer resulting in clogging of the reactor.

An apparatus for conducting the process comprising at least one reactor with an inlet for wastewater, an outlet for treated wastewater, as well as an exhaust conduit for sewer gas, and a carrier material for anaerobic microorganisms arranged within the reactor, the carrier material being the macroporous materials having a low density as previously described.

To retain the carrier material in the reactor, separating means, for example a simple screen, is suitably arranged at the outlet of the reactor.

Since, in such an apparatus according to the invention, the bacteria participating in the anaerobic process are, on the one hand, firmly fixed in the macropores of the carrier material and, on the other hand, the carrier material can be retained in the reactor with the aid of the separating means, there is the possibility, if such an apparatus is only to be used for the preliminary treatment of a wastewater, to connect this apparatus without the interposition of an intermediate settling means to a follow-on final treatment stage.

BRIEF DESCRIPTION OF THE DRAWING

The drawing depicts, in schematic form, a preferred embodiment of apparatus for conducting the process.

DETAILED DESCRIPTION OF THE DRAWING

A cyclindrical reactor 1, sealed with respect to the atmosphere, contains carrier material 2 for microorganisms participating in an anerobic process, said material being preferably polyurethane foam or foam rubber. The wastewater to be treated as introduced via an inlet 3 at the upper end of the tank 1, whereas the treated wastewater is discharged at the lower end through a separating means 5 which can be a simple screen, for example, and then through an outlet 4. At the upper end of the reactor 1, an exhaust conduit 6 is provided to withdraw sewer gas produced during the anaerobic process, and a feed conduit 7 is also connected to this upper end for the introduction of sodium hydroxide or other alkaline compounds to adjust the pH value.

Instead of the illustrated stationary bed of particulate polyurethane foam i.e., regulary or irregulary shaped, shredded or cut polymethan particles or of one of more large blocks of polyurethane foam, a fluidized bed can also be provided containing only the polyurethane foam, particles, and the wastewater is in this case conducted through the reactor from the bottom toward the top at a fluidizing velocity. The thus-purified wastewater is then discharged by way of a top-positioned separating means and outlet. The type of process operation selected depends essentially on the concentration of the wastewater to be treated. For example, if the concentration of the wastewater is greater than 5000 mg/l a stationary bed is used, whereas if the concentration of the wastewater is lower than 5000 mg/l, a fluidized bed or a thoroughly mixed aeration tank or agitated vessel is used.

For exemplified additional details of conventional anaerobic reaction conditions and examples of microorganisms of the type comtemplated by this invention, attention is invited to the following references incorporated herein: "Anaerobic Treatment of Industrial Wastes" by G. W. Scammel, Process Biochemistry, October 1975; "The Anaerobic Filter for Waste Treatment", James C. Young, Perry L. McCarty, JWCPF, Vol. 41, 1969, pages R160-R174.

For additional exemplified details of expanded bed and stationary bed processes, attention is invited to the following references, also incorporated herein: "Physicochemical Treatment of Wastewater", Walter J. Weber, Charles B. Hopkins, Ralph Bloom, Jr., JWPCF, Vol. 42, No. 1, 1970, pages 83-99.

Numerical data for a preferred embodiment for the treatment of a highly loaded wastewater in an anaerobic reactor filled with foam material according to the invention are set forth hereinbelow, wherein the bed in the first example is of the fluidized type and in the second example of the stationary type and the microorganisms were hydrolytic and acid forming bacteria (such as *Glostridium thermocellum*), acetogenic bacteria (such as *Acetobacterium woodii*) and methanogenic bacteria (such as *Methanosarcina barkeri*), as set forth in "Anaerobic Digestion" by Stafford et al, Applied Science Publishers limited, London (1980) page 74.

| Carrier material | polyurethane foam cubes having an edge length of 2 cm, a density of 30 kg/m$^3$ and a pore size of 1-3 mm | |
| --- | --- | --- |
| | fluidized bed | stationary bed |
| Carrier mass and distribution: | 1,100 kg $\doteq$ 20 kg per m$^3$ of reactor bed | 1500 kg $\doteq$ 27 kg/m$^3$ |
| Reactor volume: | 65 m$^3$ (cylindrical) | 65 m$^3$ |
| Reactor bed volume: | 55 m$^3$ | 55 m$^3$ |
| Height/Diameter ratio: | 3:1 | 0.9:1 |
| Rate of feed: | 4 m$^3$/h | 2.7 m$^3$/h |
| Residence time: | 14 h | 20 h |
| BOD$_5$ feed conc.: | 5,000 mg/l | 10,000 mg/l |
| BOD$_5$ discharge conc.: | <500 mg/l | <500 mg/l |
| Temperature in reactor: | 35-39° C. | 35-39 |
| pH in reactor: | 6.5-7.5 | 6.5-7.5 |
| CH$_4$ Content of waste gas: | >75 vol % | >75 |

| | | |
|---|---|---|
| -continued | | |
| Flow-velocity | 0.55 m/h | 0.16 m/h |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for the anaerobic biological growth treatment of wastewater containing pollutants comprising conducting the wastewater through at least one reactor containing anaerobic microorganisms retained on a particulate carrier material to biologically convert organic material in wastewater under anaerobic conditions to sewer gas containing methane and carbon dioxide, the improvement comprising conducting the wastewater through an agitated bed reactor employing a mechanical agitator having a rotational velocity of 1-10 rpm, so as to not comminute the particulate carrier material and so as to accelerate mass transfer and conversion of organic pollutants, said reactor containing the anaerobic microorganisms retained on said particulate carrier material having a particle size of 10-50 mm in diameter, a density of 10-200 kg/m$^3$ and open macropores throughout of a diameter of 1-5 mm, the carrier material being made of polyurethane foam or foam rubber and the anaerobic microorganisms growing on said open macroporous carrier material in a decentralized fashion due to said open macropores, substantially uniformly throughout the carrier whereby a high mass transfer surface is obtained and excessive localized growth is precluded, and wherein the process is conducted in a reactor wherein the carrier material is non-fluidized.

2. A process according to claim 1 wherein the carrier material is polyurethane foam.

3. A process according to claim 1 wherein the carrier material is foam rubber.

4. A process according to claim 1 wherein the open macropores have a diameter of 1-3 mm.

5. A process according to claim 4 wherein the particulate carrier material has a particle size of 10-20 mm and a density of 20-80 kg/m$^3$.

6. In a process for the anaerobic biological growth treatment of wastewater containing pollutants comprising conducting the wastewater through at least one reactor containing anaerobic microorganisms retained on a particulate carrier material to biologically convert organic material in wastewater under anaerobic conditions to sewer gas containing methane and carbon dioxide the improvement comprising conducting the wastewater at a flow velocity in the range of 0.02 to 1 m/h through a stationary bed reactor containing the anaerobic microorganisms retained on said particulate carrier material having a particle size of 10-50 mm in diameter, a density of 10-200 kg/m$^3$ and open macropores throughout of a diameter of 1-5 mm, the carrier material being made of an organic polymer and the anaerobic microorganisms growing on said open macroporous carrier material in a decentralized fashion due to said open macropores, substantially uniformly throughout the carrier whereby a high mass transfer surfaces is obtained and excessive localized growth is precluded, and wherein the process is conducted in a reactor wherein the carrier material is non-fluidized.

7. A process according to claim 6 wherein the carrier material is polyurethane foam.

8. A process according to claim 6 wherein the carrier material is foam rubber.

9. A process according to claim 6 wherein the open macropores have a diameter of 1-3 mm.

10. A process according to claim 9 wherein the particulate carrier material has a particle size of 10-20 mm and a density of 20-80 kg/m$^3$.

* * * * *